United States Patent
Florencio et al.

(10) Patent No.: US 6,373,894 B1
(45) Date of Patent: Apr. 16, 2002

(54) METHOD AND APPARATUS FOR RECOVERING QUANTIZED COEFFICIENTS

(75) Inventors: Dinei Afonso Ferreira Florencio, Plainsboro; Iraj Sodagar, Princeton, both of NJ (US)

(73) Assignees: Sarnoff Corporation, Princeton, NJ (US); Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/024,084

(22) Filed: Feb. 17, 1998

Related U.S. Application Data (60) Provisional application No. 60/038,846, filed on Feb. 18, 1997.

(51) Int. Cl.[7] .................................................. H04B 1/66
(52) U.S. Cl. ........................... 375/240.19; 375/210.29
(58) Field of Search ........................ 375/240.02, 240.03, 375/240.04, 240.18, 240.19, 240.24, 240.25, 240.26, 240.29; 382/232, 234, 236, 240, 248, 250, 268, 264, 166; 704/500, 503; 341/51, 87; H04B 1/66

(56) References Cited

U.S. PATENT DOCUMENTS

| | | | |
|---|---|---|---|
| 5,227,875 A | * 7/1993 | Suu et al. ................. 358/133 |
| 5,392,037 A | * 2/1995 | Kato ......................... 341/67 |
| 5,495,538 A | 2/1996 | Fan .......................... 382/233 |
| 5,590,064 A | * 12/1996 | Astle ...................... 364/715.02 |
| 5,590,222 A | 12/1996 | Kojima ..................... 382/268 |
| 5,852,982 A | * 12/1998 | Kim ......................... 382/268 |
| 5,870,146 A | * 2/1999 | Zhu ........................ 348/409.1 |
| 5,937,101 A | * 8/1999 | Jeon et al. ................. 382/268 |
| 5,974,196 A | * 10/1999 | Chang et al. .............. 382/268 |
| 6,002,802 A | * 12/1999 | Chujoh et al. ............. 382/236 |
| 6,011,499 A | * 1/2000 | Agarwal et al. ............. 341/67 |
| 6,011,864 A | * 1/2000 | Wu et al. .................. 382/232 |
| 6,021,216 A | * 2/2000 | Sathe et al. ................ 382/166 |
| 6,115,420 A | * 9/2000 | Wang ....................... 375/240 |
| 6,128,413 A | * 10/2000 | Benamara ................. 382/250 |
| 6,253,185 B1 | * 6/2001 | Aream et al. .............. 704/500 |

FOREIGN PATENT DOCUMENTS

| | | |
|---|---|---|
| EP | 0 659 019 A2 | 6/1995 |
| EP | 0 659 019 A3 | 4/1997 |

OTHER PUBLICATIONS

Kwak, et al. "Projection–Based Eigenvector Decomposition for Reduction of Blocking Artifacts of DCT Coded Image" Proceedings of the International Conference on Image Processing (ICIP), Oct. 23, 1995, pp. 527–530.

* cited by examiner

*Primary Examiner*—Chris Kelley
*Assistant Examiner*—Tung T. Vo
(74) *Attorney, Agent, or Firm*—William J. Burke (57) ABSTRACT

An apparatus and a concomitant method is disclosed for recovering or adjusting quantized coefficients by using a nonlinear method. The method operates by fitting the received signal into one of several predefined classes, and adjusting the signal as appropriate to better fit the best suited class.

21 Claims, 4 Drawing Sheets

METHOD AND APPARATUS FOR RECOVERING QUANTIZED COEFFICIENTS

This application claims the benefit of U.S. Provisional Application No. 60/038,846 filed Feb. 18, 1997, which is herein incorporated by reference.

The present invention relates to a method and apparatus for reducing blocking and ringing artifacts associated with coding of images or video frames. More particularly, this invention relates to a method and apparatus that recovers or adjusts quantized coefficients by using a nonlinear scheme.

BACKGROUND OF THE INVENTION

Quantization is a well known process where the coefficients are quantized by a quantization scale or level (quantizer). Namely, the process of quantization reduces the accuracy with which the coefficients are represented by dividing the coefficients by a set of values (quantization scales or levels) with appropriate rounding to form integer values. This quantization process is generally known as uniform quantization. Alternatively, quantization can be implemented as non-uniform quantization, where a bin (a range of mapped values) varies with the input signal. However, the process of quantization (uniform or non-uniform) is lossy. Namely, after a coefficient has been quantized, a decoder (without the benefit of additional information) would not be able to recover the original coefficient values.

Furthermore, quantization is frequently employed in coding/decoding applications, e.g., video encoders and video decoders. The significant saving in encoded bits resulting from the quantization process is an important factor for codec applications. In addition, adjusting the quantization level for a frame or picture is a popular method of controlling the number of bits generated by an encoder (generally referred to as "rate control").

However, since the quantization process is lossy, it contributes to the blocking and ringing artifacts exhibited by decoded images. Some of these effects often can be traced to the quantization of the coefficients produced by a transform operation. Furthermore, since many transforms are designed to be orthogonal, there is no linear correlation among the coefficients to aid in the recovery of the coefficients by linear methods.

Therefore, a need exists in the art for a method and apparatus for recovering quantized coefficients.

SUMMARY OF THE INVENTION

The present invention is a method and apparatus for recovering or adjusting quantized coefficients by using a nonlinear method. A forward transform is employed to adjust the quantized coefficients after post inverse quantization and inverse transform operations are performed.

More specifically, the quantized coefficients are initially transformed into pixel values using complementary inverse quantization and transform operations. However, due to the lossy process of quantization, the resulting decoded pixel values are not the identical original pixel values prior to undergoing the encoding and decoding process. To more accurately recover the original pixel values, the decoded pixel values are adjusted using a forward or direct transform that is equivalent to the forward transform that was used in the encoder to encode the original signal. The method divides the decoded pixel values into a plurality of blocks, where each block is, in turn, divided into a plurality of subblocks. Coefficient corrections or adjustments which are derived from a fitting function, (e.g., the difference between a median and a certain expected value, like "0" for motion compensated blocks) calculated for the subblocks, are applied to the transform to produce transform coefficients. These transform coefficients are then compared with the quantization step employed by the encoding process to determine whether the coefficient corrections should be used to adjust the decoded pixel values.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
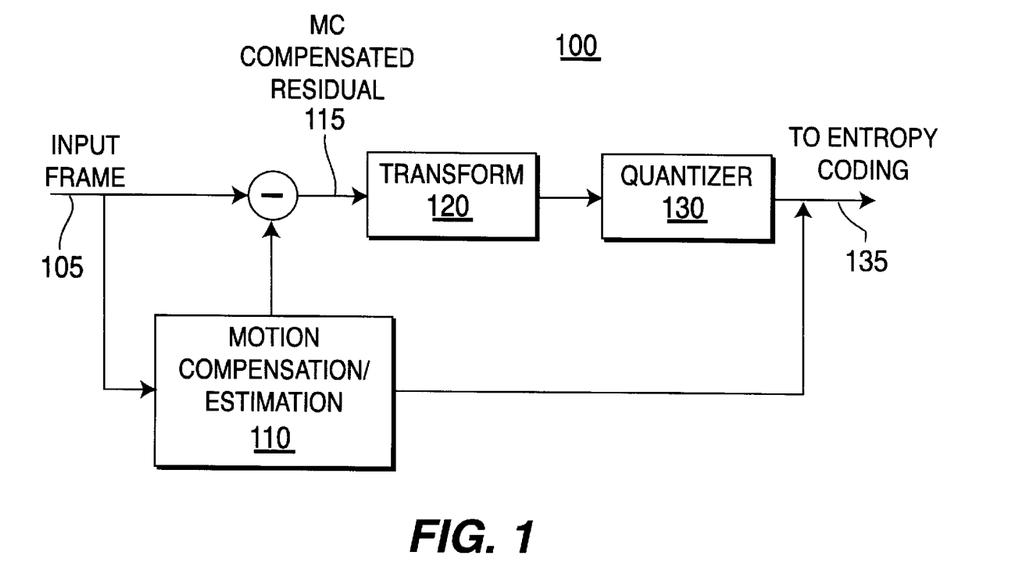
FIG. 1 illustrates a block diagram of a simplified structure of a conventional encoder.

FIG. 1 depicts a block diagram of a simplified structure of a video encoder 100, e.g., an MPEG encoder, for encoding an input image or frame (e.g., within an image sequence) on path 105 to produce a bitstream. Although an MPEG-like encoder with motion estimation/compensation is used below to illustrate the present invention, it should be understood that the present invention is not limited to such an encoder.

The input image is typically a pixelated (digitized) photographic image as can be produced from an image scanner or a computer graphics system. However, the input image can also be a frame within a series of frames of video images or a motion compensated residual frame produced by a video encoding system. In general, the present invention processes any form of digitized image or portion thereof. The encoder 100 is designed to perform temporal redundancy reduction (e.g., motion compensation), which is followed by spatial redundancy reduction (e.g., discrete cosine transform or wavelet transform).

More specifically, motion compensation/estimation section 110 constructs a motion compensated prediction (predicted image). This predicted image is subtracted from the input video image to form an error signal (e) or motion compensated residual (residual image) on path 115. It should be noted that encoders are permitted to encode an input image using different coding modes, e.g., inter mode coding and intra mode coding are two broad classifications. As such, the input image to the transform section 120 on path 115 can be the original input image from path 105 (e.g., using an intra coding mode), a motion compensated residual (e.g., using an inter coding), or any modified image that is representative of the original input image. Namely, for the purpose of the discussion below and the interpretation of the claims, a "transform input image" is an image on path 115, which serves as an input signal to the transform section 120.

Returning to FIG. 1, the residual (transform input image) is then transformed and quantized by the transform section 120 and the quantizer section 130 respectively. The resulting quantized coefficients are forwarded on path 135 to an entropy encoder which may incorporate various entropy coding methods, e.g., variable length and/or run-length coding. The transform section 120 may incorporate various transforms, including but not limited to, Discrete Cosine Transform (DCT) or wavelet transform (otherwise known as hierarchical subband decomposition). As such, although the present invention is described below with reference to a Haar wavelet transform, the present invention is not so limited.

Typically, the motion compensated residual is composed mostly of zeros or small values (the regions where motion compensation was effective) and a few pixels/regions with high values. When applying the wavelet transform, the high values may spread over the "zero" regions, thereby giving origin to artifacts normally known as ringing (and for short filters, blocking). If the quantization step is small, this distortion is negligible. However, if the quantization step is large, then the artifacts may significantly reduce the quality of the decoded signal.

Furthermore, although not shown, those skilled in the art will realize that the encoder 100 may incorporate additional sections such as an inverse quantization section, an inverse transform section and/or an output buffer.

Figure 5:
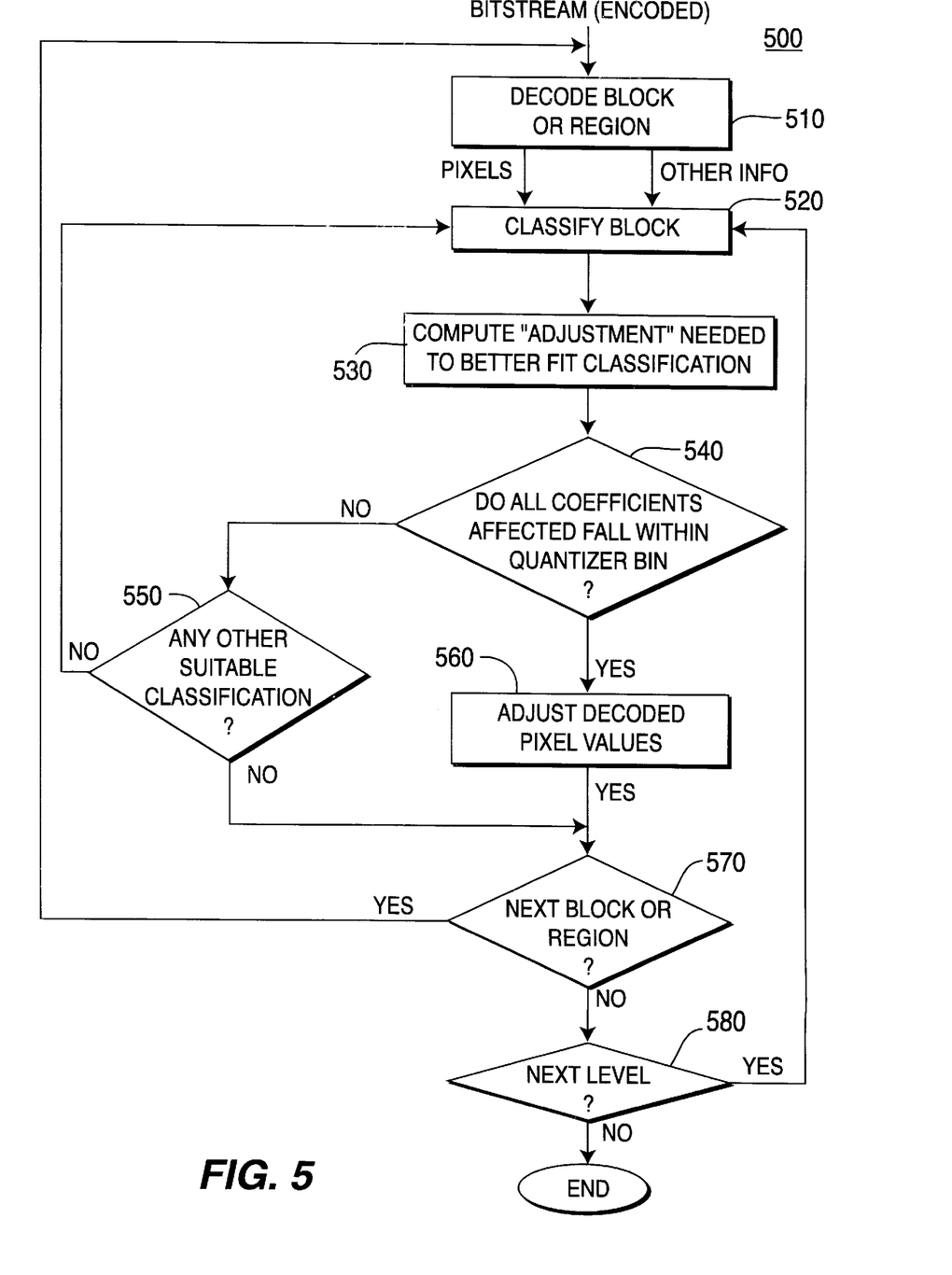
FIG. 5 illustrates a flowchart of a method for recovering quantized coefficients.

FIG. 5 illustrates a flowchart of a method 500 for recovering quantized coefficients by exploiting the non-linear correlations between the coefficients. Although most transforms are designed to produce coefficients that are devoid of linear correlations, non-linear correlations often exist which are available for refining the recovery or adjustment of the coefficients after an inverse transform operation.

In the preferred embodiment, the method for recovering the quantized coefficients is implemented in a decoder, e.g., a video decoder. However, the novel method can be implemented in other systems or applications where there is a need to recover quantized transform coefficients. Of particular interest is the case where the method is incorporated in both encoder and decoder. In this case, the adjustment can be incorporated into the reference images used for motion compensation.

The recovering method described herein is based on having one or more assumptions that describe the signal. In most cases, this will mean describing a single block or region of the image. For example, reasonable classes for an intra coded frame may include an "edge block", a "flat region block", a "texture block", a "slanted plane block", and so on. For motion compensated blocks (i.e., inter coded blocks), a good assumption is that "most of the samples in the block are zero".

More specifically, linear transforms are premised that a signal is based around a value zero. Namely, the signal is centered around a value zero in terms of the mean or the average of the samples from the signal. However, this general perception of a signal is not entirely accurate. Instead, a more accurate perception is that the median of the signal is around the value zero. Using this new premise, FIG. 5 is described below for recovering quantized coefficients by exploiting the non-linear correlations between the coefficients.

Figure 3:
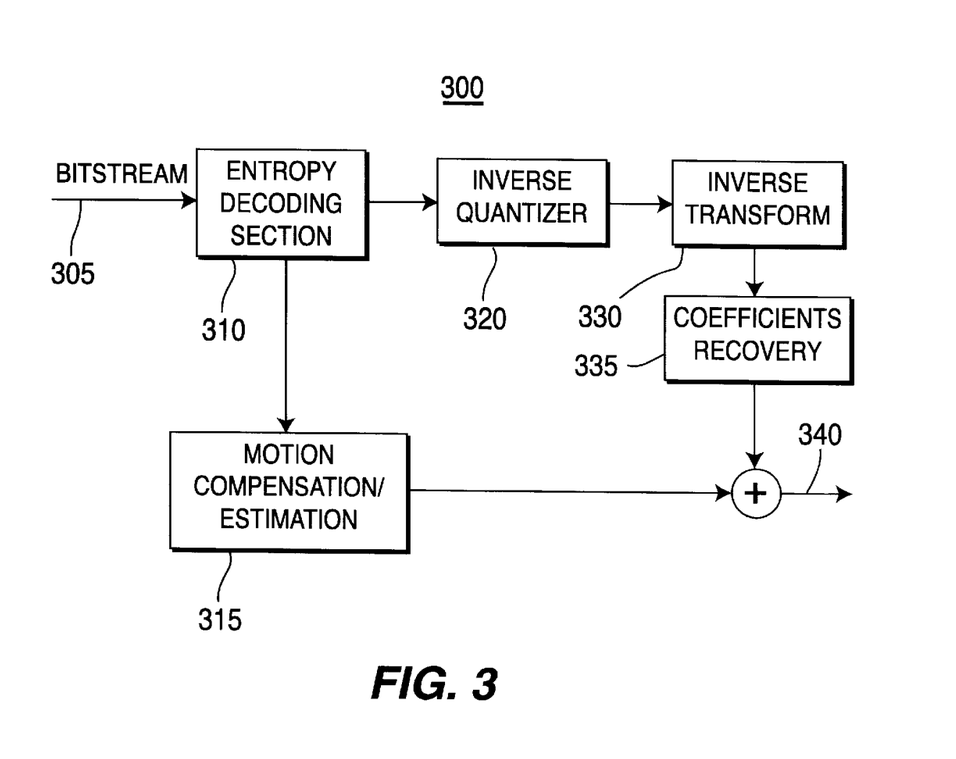
FIG. 3 illustrates a block diagram of the basic structure of a decoder implementing the present invention.

More specifically, method 500 starts in step 510, where an encoded signal is received, e.g., from a communication channel, and is decoded by a decoder such as shown in FIG. 3 below. The decoder may decode a block, a region or a frame of the encoded signal. The particular unit of the encoded signal that is decoded is often dictated by the decoder, e.g., an MPEG compliant decoder often decodes one macroblock at a time. For the purpose of illustration, the method 500 for recovering quantized coefficients is described using "blocks" of the encoded image signal. Thus, depending on the block size, step 510 may include the step of dividing a decoded image into blocks, if necessary. Depending on the decoding method, after a whole frame is decoded, there is no need for decoding specific blocks again.

It should be noted that the present invention is not limited to any particular block size. However, the block size is selected to match the block size of the transform used in the encoder (e.g., 120 as shown in FIG. 1), i.e., in accordance with the basis function of the transform.

The decoding step 510 reverses the encoding process of the encoder to generate pixels (pixel values) that represent the original image signal. Since the quantization process employed in the encoder is lossy, the pixels generated by the decoding step 510 is an approximation of the original pixel values. Other information associated with the encoded image signal is also decoded by the decoding step 510, e.g., header information including the quantizer or quantization matrix used by the encoder to generate the encoded signal.

In step 520, the decoded block is classified. Namely, each block is classified for the purpose of determining the adjustments that can be applied to the decoded pixels to better approximate the original pixel values. For example, if each block in step 520 is further divided into four (4) subblocks, then it is possible to define four (4) classifications as follows:

1) all medians of the four subblocks can be set to zero.
2) three medians of the four subblocks can be set to zero.
3) two medians of the four subblocks can be set to zero.
4) one median of the four subblocks can be set to zero.

These classifications (or assumptions) are then used to compute adjustments for the decoded pixels. It should be noted that the present invention is not limited to these four classifications. Method 500 in step 520 could make intelligent classification decisions based on the information provided by block 510. Nevertheless, for illustration purposes, it is described herein an approach where method 500 in step 520 will successively assign each one of the four above categories, until one of them satisfies the requirements in step 540 below. Therefore a block is initially classified as having all medians zero.

In step 530, method 500 computes the adjustments that are needed to fit the classification selected for the block in step 520. More specifically, the adjustments are computed by minimizing a fitting function. The fitting function is a measure of the similarity between a class of blocks and the specific decoded signal. For example, the adjustments for a class of motion compensated blocks will be computed from the medians of subblocks. More specifically, the fitting function will be the sum of absolute differences between the medians of each block and the target median, where the target median is set at zero.

More specifically, the adjustments are computed by determining the values ("median adjustment values") that will set the medians of the four subblocks to zero, thereby minimizing the fitting function. Next, the median adjustment values (adjustments) are applied to a transform to produce transform coefficients ("transformed median adjustment values"). The transform is the same transform that was used in the encoder for generating the encoded image signal.

It should be noted that typical fitting functions may include other distance measures, e.g., sum of absolute differences or means square error. For example, for the class of intra coded blocks (e.g., the slanted plane block), an appropriate distance measure can be means square error between the received signal and a plane, where the plane is chosen to minimize this fitting function.

In step 540, method 500 queries whether the transform coefficients are capable of being quantized to zero using the quantization step corresponding to the quantization matrix (and quantizer level in the case of non-uniform quantizer) that was used to generate the encoded image signal. In other words, method 500 queries whether the transform coefficients fall within the quantizer bin. If the query is negatively answered, then method 500 proceeds to step 550. If the query is positively answered, then method 500 proceeds to step 560, where the decoded pixels are adjusted by the median adjustment values.

In step 550, method 500 queries whether other classifications may be more suitable to compute the adjustments. Namely, method 500 queries whether there are any remaining classifications that can be used to compute the adjustments. If the query is negatively answered, then method 500 proceeds to step 570. If the query is positively answered, then method 500 proceeds to step 520, where the current block is reclassified, e.g., as having three medians of the four subblocks capable of being set to zero. Steps 530 and 540 are then repeated for the new classification. However, one of the subblocks is now removed from consideration in the computation of the median adjustment values. The loop defined by steps 520, 530, 540 and 550 is repeated until suitable adjustments are computed or until all classifications are exhausted. If all classifications are exhausted without determining suitable adjustments, then the decoded pixels are not adjusted.

In step 570, method 500 queries whether there are any more blocks in the current frame. If the query is negatively answered, then method 500 proceeds to step 580. If the query is positively answered, then method 500 proceeds to step 510, where the method is repeated for the next block.

In step 580, method 500 queries whether there is a next level for the current frame. Namely, if the transform employed by the encoder is a hierarchical transform, e.g., a wavelet transform, then it is possible to repeat method 500 for the next level having a different block size.

For example, method 500 can start with a 2×2 block size. When the entire image is processed using the smaller block size, method 500 can repeat the process using a larger 4×4 block, and so on. Thus, if the query in step 580 is negatively answered, then method 500 ends. If the query is positively answered, then method 500 proceeds to step 520, where the method is repeated for the next level or block size.

Figure 2:
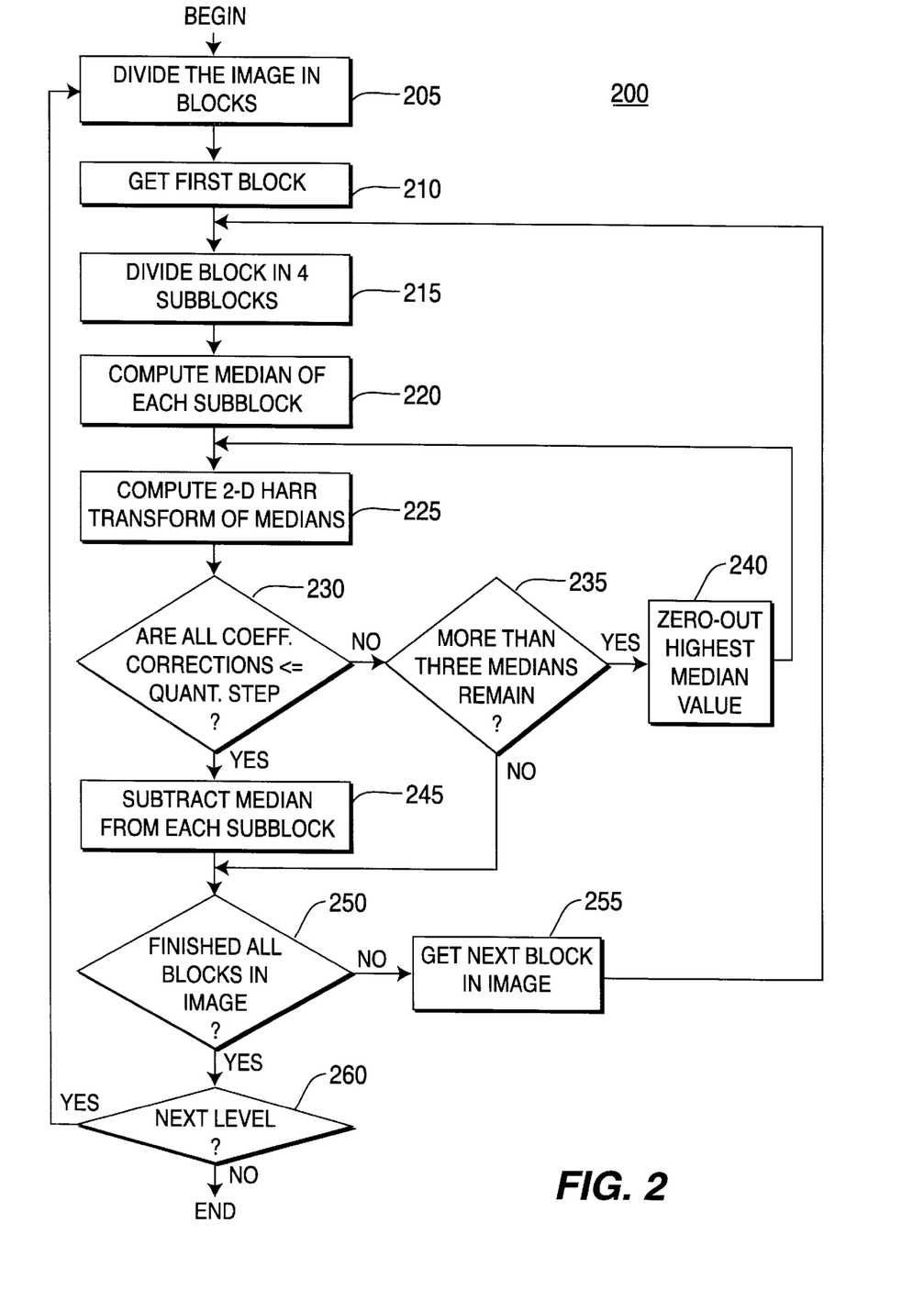
FIG. 2 illustrates a flowchart of a specific method for recovering quantized coefficients using a Haar transform.

FIG. 2 illustrates a flowchart of a specific method 200 for recovering quantized coefficients, where the non-linear post-processing method for recovering the coefficients is based on a Haar transform. In brief, the Haar transform is a transformation that separates an input signal into two sequences, i.e., one sequence expresses the input signal in terms of average values and the other sequence in terms of changes. By employing the Haar transformation, the recovered coefficients are recovered to a precision higher than that provided by an inverse quantizer alone.

It should be noted that methods 200 and 500 are applied after the operation of an inverse transform operation, e.g., inverse wavelet transform. For example, methods 200 and 500 can be applied in a decoder which has received a plurality of wavelet coefficients. The decoder applies inverse wavelet transform to produce decoded pixel values, which are then received and operated by methods 200 and 500 as described below in the coefficients recovery section 335 of FIG. 3. As such, the term "transform coefficients" as described in the methods 200 and 500 should not be confused with the coefficients resulting after a transform operation in the encoder.

Method 200 starts in step 205 by dividing an image (e.g., a decoded input image) into a plurality of blocks, i.e., wavelet blocks. The size of the blocks corresponds to the size of the blocks used by the transform operation executed by the encoder. In step 210, method 200 obtains the first block and further divides the selected block into (4) four subblocks in step 215. Although in the preferred embodiment each block is divided into four subblocks, the block can be divided into any number of subblocks. However, the block size is typically set in accordance with the basis function of the transform used in the encoder.

In step 220, method 200 computes the median for each subblock, which, in turn, can be used to generate a median adjustment value for the subblock (which is simply the negative of the median value). The premise is that the portion of the signal that is being represented by the subblocks has medians that are centered around zero. For example, if a median is computed to be a value of two (2), then a coefficient correction or median adjustment value of negative two (−2) added to the samples will cause the median to be zero. Thus, if the coefficient corrections that set the medians to zero when quantized would produce a zero, then these coefficient corrections may have been eliminated ("zero-out") through quantization. The medians are computed from the actual decoded pixel values.

In step 225, method 200 applies a 2-D wavelet (Haar) transform to the median adjustment values to generate transform coefficients ("transformed median adjustment values").

In step 230, method 200 queries whether all the transform coefficients within the current four subblocks are smaller or equal to the quantization step selected for the image. (Alternatively, if a quantization matrix is employed, then 200 queries whether each of the corresponding transform coefficients is smaller or equal to an associated quantization step in the quantization matrix.) If the query is affirmatively answered, then method 200 proceeds to step 245, where the associated median is subtracted from each subblock (or the associated median adjustment value is added to each subblock). More specifically, all the transform coefficients within a subblock are adjusted by a correction equal to the calculated median for that subblock. If the query is negatively answered, then method 200 proceeds to step 235. If some transform coefficients are higher than the quantization step, then it indicates that those medians (or at least some of them) should not be zero-out.

In step 235, method 200 queries whether there are more than three (3) medians remaining. It should be noted that initially, there are as many medians as there are subblocks, i.e., four (4) medians in the preferred embodiment. If the query is negatively answered, then method 200 proceeds to step 250. If the query is affirmatively answered, then method 200 proceeds to step 240, where the highest median value is zero-out. Namely, method 200 discards the highest median and returns to step 225, where method 200 computes a 2-D Haar transform of the remaining three (3) medians. The "discarded" median is not altered by method 200. Namely, the subblock associated with the "discarded" median will not be adjusted by method 200.

In the preferred embodiment, method 200 alters all four subblocks or at least three subblocks, if possible. However, the loop represented by steps 230, 235 and 240 can be repeated to alter two subblocks, one subblock or up to a threshold of remaining subblocks, if so desired for a particular application.

In step 250, method 200 queries whether all blocks within the image are processed. If the query is affirmatively answered, then method 200 proceeds to step 260, where the decoded pixel values for the entire image have been recovered. If the query is negatively answered, then method 200 proceeds to step 255, where the next block is selected and the steps of 215–245 are repeated.

Similar to FIG. 5, in step 260 method 200 queries whether there is a next level for the current frame. Namely, if the transform employed by the encoder is a hierarchical transform, e.g., a wavelet transform, then it is possible to repeat method 200 for the next level having a different block size. Thus, if the query in step 260 is negatively answered, then method 200 ends. If the query is positively answered, then method 200 proceeds to step 205, where the method is repeated for the next level or block size.

Thus, method 200 is disclosed for recovering quantized coefficients using a Haar transform. Furthermore, FIG. 2 illustrates another way of describing the present invention, where classification of the block can be replaced by simply setting an initial assumption for all blocks. The assumption is tested and repeatedly revised, as necessary. The number of assumptions can be selectively defined or limited for an application. However, the use of classifications can be implemented to reduce computational cycles, especially if there is information that can be exploited to quickly eliminate some classifications from consideration.

For example, if an I-frame is detected, then the present method can be skipped altogether. Alternatively, the image content within the blocks may have been evaluated by the encoder for other purposes, e.g., rate control, mode decision and etc., which can be passed to the decoder to aid the decoder in quickly eliminating some classifications from consideration.

FIG. 3 depicts a block diagram of a simplified structure of a decoder 300 for implementing the coefficient recovery methods 200 and 500. The decoder 300 comprises an entropy decoding section 310, a motion compensation/estimation section 315, an inverse quantizer section 320, an inverse transform section 330 and a coefficients recovery section 335.

The decoder 300 accepts an encoded bitstream (e.g., encoded video images) on path 305 and decodes the various data elements which are used to produce a decoded output on path 340. The encoded bitstream can be received directly from a transmission channel or from an input buffer (not shown).

Specifically, the encoded video bitstream is received by the entropy decoding section 310, which decodes the picture type and all other information via a plurality of entropy code tables. Various mode control information are forwarded to the motion compensation/estimation section 315 which may comprise a backward motion compensation (MC) section, an interpolated MC section, a forward MC section, an intra coding section and various frame storage buffers or memories (not shown). The proper selection of a particular motion compensation or intra coding section depends upon the picture type of a decoded picture. The decoded motion vectors, if any, giving the displacement from the stored previous and/or future pictures are also received by the motion compensation/estimation section 315. In brief, the previous and future reference pictures are stored in the previous frame memory buffer and future frame memory buffer (not shown) respectively. These stored frames are used in conjunction with the motion vectors to produce a predicted frame.

The entropy decoding section 310 also decodes the quantized coefficients that are representative of the transform input image. The decoded quantized coefficients are forwarded to the inverse quantizer 320 and inverse transform 330, where the inverse quantization and inverse transform are applied to the quantized coefficients. Namely, the quantized coefficients are converted into decoded pixel values which are forwarded to coefficients recovery section 335 which applies method 200 as discussed above. Finally, the adjusted pixel values are added to a predicted block, if any, to produce the decoded input image or picture on path 340.

Figure 4:
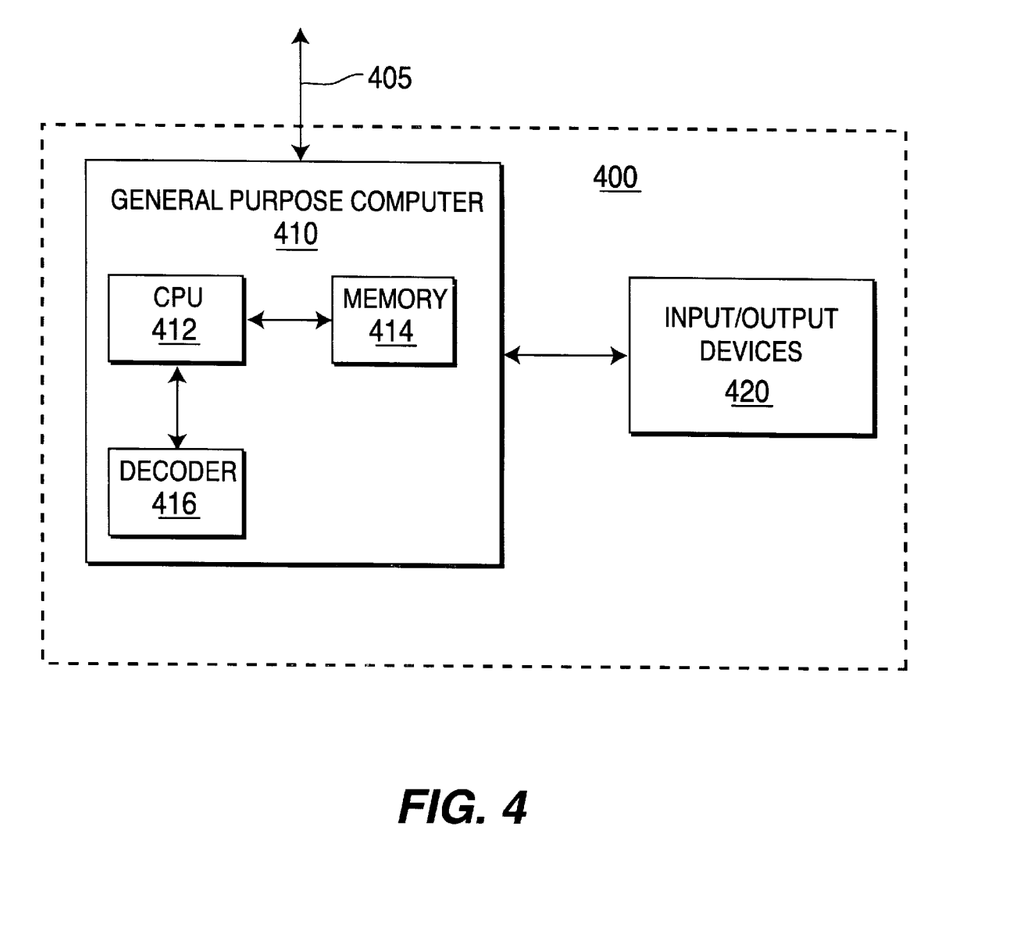
FIG. 4 illustrates a decoding system of the present invention.

FIG. 4 illustrates a decoding system 400 of the present invention. The decoding system 400 is coupled to an encoding system (not shown) via a communication channel 405. The present invention is not limited to any particular type of communication channel.

The decoding system 400 comprises a general purpose computer 410 and various input/output devices 420. The general purpose computer comprises a central processing unit (CPU) 412, a memory 414 and an decoder 416 for receiving and decoding a sequence of encoded images.

In the preferred embodiment, the decoder 416 is simply the decoder 300 as discussed above. The decoder 416 can be a physical device which is coupled to the CPU 412 through a communication channel. Alternatively, the decoder 416 can be represented by a software application which is loaded from a storage device, e.g., a magnetic or optical disk, and resides in the memory 414 of the computer. As such, the decoder 300 of the present invention can be stored on a computer readable medium.

The computer 410 can be coupled to a plurality of input and output devices 420, such as a keyboard, a mouse, a video monitor, or any number of devices for storing or distributing images, including but not limited to, a tape drive, a floppy drive, a hard disk drive or a compact disk drive. The input devices serve to allow the computer for storing and distributing the sequence of decoded video images.

There has thus been shown and described a novel method and apparatus for recovering quantized coefficients by using a nonlinear scheme. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Method for adjusting decoded pixel values that are representative of an image, where said decoded pixel values have previously undergone a transform operation and a quantization operation, said method comprising the steps of:
   (a) selecting a block of decoded pixel values;
   (b) dividing said block into a plurality of subblocks;
   (c) computing an adjustment for each of said subblocks;
   (d) applying a forward transform to said plurality of adjustments to produce a plurality of transform coefficients;
   (e) determining whether said plurality of adjustments should be applied to said decoded pixel values; and
   (f) adjusting said decoded pixel values within each subblock in accordance with said plurality of adjustments, if said determining step (e) determines that said plurality of adjustments should be applied.

2. The method of claim 1, wherein said applying step (d) applies a 2-d Haar transform.

3. The method of claim 1, wherein said dividing step (b) divides said block into four subblocks.

4. The method of claim 1, wherein said selecting step (a) selects a block size that correlates to a block size employed by the transform operation.

5. The method of claim 1, wherein said determining step (e) comprises the step of:
   (e1) comparing said plurality of transform coefficients with a quantization step employed by the quantization operation;
   (e2) determining that said plurality of adjustments should be applied to said decoded pixel values within each of said subblocks, if all of said adjustments of all of said subblocks are below said quantization step; and
   (e3) removing a subblock that corresponds to a highest adjustment, if at least one of said adjustments of said subblocks is above said quantization step, and repeating said steps (d) to (e3) for said remaining subblocks.

6. The method of claim 5, wherein said determining step (e) stops if said remaining subblocks fall below a threshold of remaining subblocks.

7. The method of claim 6, wherein said threshold of remaining subblocks is set at three.

8. The method of claim 1, wherein said adjustments in said computing step (c) is computed by minimizing a fitting function.

9. The method of claim 8, wherein said fitting function is a sum of absolute differences between a plurality of medians of said block and a target median.

10. The method of claim 1, wherein steps (a) through (f) are repeated for a next hierarchical level of the image.

11. Apparatus for adjusting decoded pixel values that are representative of an image, where said decoded pixel values have previously undergone a transform operation and a quantization operation, said apparatus comprising:
   a first selecting means for selecting at least one block of decoded pixel values;
   a first dividing means for dividing said at least one block into a plurality of subblocks;
   computing means for computing an adjustment for each of said subblocks;
   applying means for applying a forward transform to said plurality of adjustments to produce a plurality of transform coefficients;
   a first determining means for determining whether said plurality of adjustments should be applied to said decoded pixel values; and
   adjusting means for adjusting said decoded pixel values within each subblock in accordance with said plurality of adjustments, if said first determining means determines that said plurality of adjustments should be applied.

12. The apparatus of claim 11, wherein said forward transform of said applying means is a 2-d Haar transform.

13. The apparatus of claim 11, wherein said first determining means comprises:
   means for comparing said plurality of transform coefficients with a quantization step employed by the quantization operation;
   a second means for determining that said plurality of adjustments should be applied to said decoded pixel values within each of said subblocks, if all of said adjustments of all of said subblocks are below said quantization step; and
   mean for removing a subblock that corresponds to a highest adjustment, if at least one of said adjustments of said subblocks is above said quantization step.

14. The apparatus of claim 11, wherein said adjustments in said computing means is computed by minimizing a fitting function.

15. The apparatus of claim 14, wherein said fitting function is a sum of absolute differences between a plurality of medians of said block and a target median.

16. A decoding system for adjusting decoded pixel values that are representative of an image, where said decoded pixel values have previously undergone a transform operation and a quantization operation, said decoding system comprising:
   an inverse quantizer for applying an inverse quantization process to the plurality of coefficients to produce a plurality of unquantized coefficients;
   an inverse transform for applying an inverse transform operation to said plurality of dequantized coefficients to produce the decoded pixel values representative of the image; and
   a coefficient recovery section for adjusting said decoded pixel values representative of the image, wherein said coefficient recovery section comprises:
      a first selecting means for selecting at least one block of decoded pixel values;
      a first dividing means for dividing said at least one block into a plurality of subblocks;
      computing means for computing an adjustment for each of said subblocks;
      applying means for applying a forward transform to said plurality of adjustments to produce a plurality of transform coefficients;
      a first determining means for determining whether said plurality of adjustments should be applied to said decoded pixel values; and
      adjusting means for adjusting said decoded pixel values within each subblock in accordance with said plurality of adjustments, if said first determining means determines that said plurality of adjustments should be applied.

17. The decoding system of claim 16, wherein said coefficient recovery section comprises:
   a selecting means for selecting at least one block of decoded pixel values;
   a dividing means for dividing said at least one block into a plurality of subblocks;
   means for computing an adjustment for each of said subblocks;
   means for applying a forward transform to said plurality of adjustments to produce a plurality of transform coefficients;
   a first means for determining whether said plurality of adjustments should be applied to said decoded pixel values; and
   means for adjusting said decoded pixel values within each subblock in accordance with said plurality of adjustments, if said first determining means determines that said plurality of adjustments should be applied.

18. The system of claim 17, wherein said forward transform of said applying means is a 2-d Haar transform.

19. The system of claim 17, wherein said first determining means comprises:
   means for comparing said plurality of transform coefficients with a quantization step employed by the quantization operation;

a second means for determining that said plurality of adjustments should be applied to said decoded pixel values within each of said subblocks, if all of said adjustments of all of said subblocks are below said quantization step; and mean for removing a subblock that corresponds to a highest adjustment, if at least one of said adjustments of said subblocks is above said quantization step.

20. The system of claim 17, wherein said adjustments in said computing means is computed by minimizing a fitting function.

21. A computer-readable medium having stored thereon a plurality of instructions, the plurality of instructions including instructions which, when executed by a processor, cause the processor to perform the steps comprising of:

(a) selecting a block of decoded pixel values;

(b) dividing said block into a plurality of subblocks;

(c) computing an adjustment for each of said subblocks;

(d) applying a forward transform to said plurality of adjustments to produce a plurality of transform coefficients;

(e) determining whether said plurality of adjustments should be applied to said decoded pixel values; and (f) adjusting said decoded pixel values within each subblock in accordance with said plurality of adjustments, if said determining step (e) determines that said plurality of adjustments should be applied.

* * * * *